United States Patent

[11] 3,620,561

| [72] | Inventors | Klaus Grotkasten<br>Hamburg;<br>Ingo Hirschkorn, Neu-Wulmstorf, both of Germany |
|---|---|---|
| [21] | Appl. No. | 867,270 |
| [22] | Filed | Oct. 17, 1969 |
| [45] | Patented | Nov. 16, 1971 |
| [73] | Assignee | Fried Krupp Gesellschaft mit beschrankter Haftung<br>Essen, Germany |
| [32] | Priority | Oct. 19, 1968 |
| [33] | | Germany |
| [31] | | P 18 04 097.6 |

[54] TRANSPORTING DEVICE FOR USE IN CONNECTION WITH THE MANUFACTURE OF UNVULCANIZED BELTED TIRES
3 Claims, 3 Drawing Figs.

[52] U.S. Cl. .............................................. 294/67 BC, 294/81, 294/88

[51] Int. Cl. ............................................. B66c 1/62
[50] Field of Search ......................................... 294/67 2, 92, 97, 103, 104, 88, 113, 114, 67.2 C; 214/332, 333, 650, 652, 653

[56] References Cited
UNITED STATES PATENTS

| 2,815,878 | 12/1957 | Vance | 214/652 |
| 3,437,369 | 4/1969 | Gealy | 294/113 |

Primary Examiner—Evon C. Blunk
Assistant Examiner—Johnny D. Cherry
Attorney—Walter Becker ABSTRACT: A transporting device for a raw tire, especially belted raw tire, which includes a frame having two diametrically opposite areas thereof pivotally connected to two pairs of arms carrying angle-shaped tire engaging gripper members for engaging shoulder areas and circumferential areas of said tire while control means are provided for controlling said arms.

PATENTED NOV 16 1971

3,620,561

INVENTORS
KLAUS GROTKASTEN
INGO HIRSCHKORN
BY
*Walter Becker*

TRANSPORTING DEVICE FOR USE IN CONNECTION WITH THE MANUFACTURE OF UNVULCANIZED BELTED TIRES

The present invention relates to a transporting device for a raw belted tire which conveys the raw tire in lying position from a bead-pressing device to a tire-heating press, and which has a fork-shaped frame.

Heretofore known transporting devices of the type involved are equipped with clamping jaws which automatically controlled are at relatively high-pressing forces pressed against the raw tire to be transported. In this connection, however, a deformation of the raw tire can easily occur when the tire is lifted out of the bead-pressing device and can also occur during the transport of the tire, as a result of which the central portion of the raw tire may deviate from its rated position in the transporting device. Such deviation will in most instances result in a less precise and even faulty insertion of the raw tire to be transported into the tire heating press with the result that the tire is mispressed.

According to another heretofore known transporting device, the same danger just outlined exists because the raw tire to be transported is in this instance loosely and in laterally spaced relationship to the guiding edges placed on horizontal supporting surfaces so that the tire can easily slip during the transport.

It is an object of the present invention to provide a transporting device which will overcome the above-mentioned drawbacks.

It is another object of this invention to provide a transporting device by means of which the raw tire without the danger of being deformed or slipping will be held from the outside and withdrawn from a bead-pressing device and may centrally precisely be inserted between the upper and the lower tire mold sections of an opened tire-heating press.

These and other objects and advantages of the invention will appear more clearly from the following specification in connection with the accompanying drawing, in which:

FIG. 1 diagrammatically illustrates in top view the raw tire and gripping means according to the invention for engaging a raw tire, said gripping means being shown in full lines in disengaging position and in dot-dash lines in tire-engaging position.

In conformity with the present invention, it is suggested that at both arms of the frame of the transporting device at oppositely located areas and approximately at the level of a horizontal sectional plane through the raw tire two gripper blades each are pivotally arranged which when tilted outwardly free the raw tire for a lateral outward movement and when tilted inwardly grasp the raw tire. In this connection, each gripper blade engages the raw tire at its circumference and at the lower sidewall within the area of the belt and is adapted by means of a clamping device to be arrested in this position. Such a design of the transporting device will assure a staying of the raw tire in its position relative to the frame of the device during the entire transporting operation. Therefore, the central position in the bead-pressing device will when inserting the raw tire in the tire-heating press precisely be reproduced.

Expediently, the drives for pivoting the gripper blade for the inward movement are so designed that all gripper blades will with the same minimum force engage the circumference of the raw tire so that any material deformation of the raw tire will be impossible. Inasmuch as the weight of the raw tire is absorbed by the horizontal surface of the gripper blades, already a slight radial force will suffice for preventing a lateral movement of the raw tire.

For further protecting the raw tire against deformation, according to a further development of the present invention, there is for each pair of gripper blades provided a single double acting tilting drive which with a free tiltability of the gripper blades relative to the frame brings about merely a movement of the corresponding gripper blades relative to each other. As a result thereof, even with not a precisely circular outer contour of the raw tire, the lateral holding forces will be maintained at the same magnitude.

Figure 3:
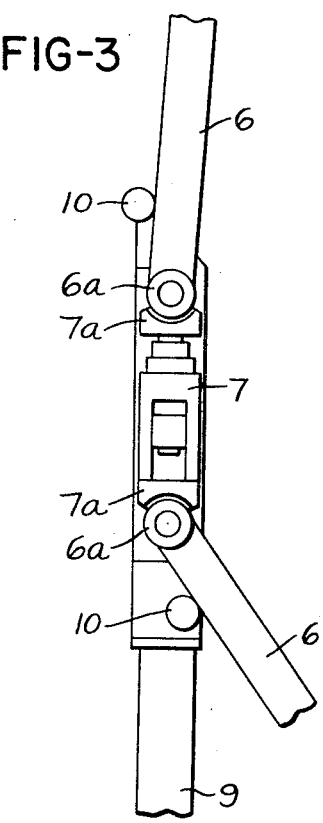
FIG. 3 illustrates on a somewhat larger scale than FIGS. 1 and 2 the locking mechanism for the gripping arms.
Figure 2:
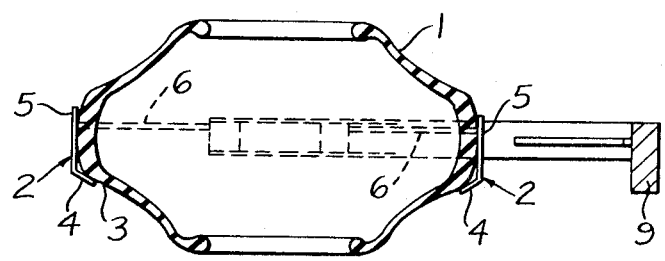
FIG. 2 is a section through the raw tire with gripper blades placed into the drawing plane for a simpler illustration.

Referring now to the drawings in detail, the raw tire 1 is during the transport of the tire held in the transporting device by means of four gripper members 2. In this connection, the raw tire 1 has its radially outer part of its lower sidewall 3 resting on the surfaces 4 of the gripper members 2 shaped in conformity with the form of the sidewall. For purposes of laterally guiding the raw tire 1, the vertical surfaces 5 of the gripper members 2 engage the circumferential surface of the raw tire 1. The gripper members 2 are pivotally connected to pivotable arms 6 which in their turn are pivotally connected to a fork-shaped frame 9. In both joints of the pivotable arms 6, one clamping device each comprising a compressed air cylinder-piston assembly 7 is arranged on the frame. By means of this clamping device it is possible to press friction or brake jaws 7a against the hubs 6a of said arms 6 (FIG. 3) to thereby arrest the arms 6 in their respective position. In addition thereto, there is provided a pneumatically operated tilting or pivoting drive for the two pivot arms 6 of a frame arm which moves the pivot arms relative to each other either inwardly or outwardly. This pivoting drive comprises two compressed air-operable cylinder-piston assemblies 8 respectively pivotally connected to arms 6 so that said arms will be able during the inward and outward movement of piston rods 8' to pivot relative to each other and relative to frame 9. With the outward movement, special end abutments 10 see to it that the two pivotable arms 6 of each pair of arms will be limited as to their outward movement and in their outer end position will extend approximately parallel to the respective frame arms 6, which means will form with each other an angle of approximately 180°. For the inward movement, the raw tire itself serves as an abutment.

Figure 1:
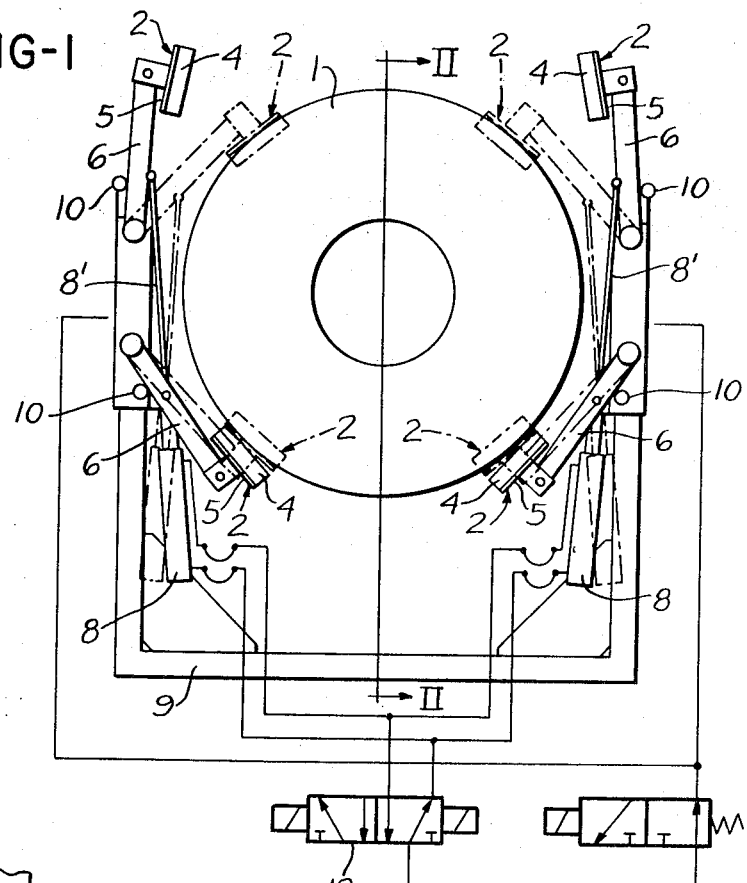

Since also the two cylinder-piston assemblies 8 are controlled together by a control valve 12 common thereto, it will be assured that all four pivotable arms 6 can at the same pressure be pressed against the raw tire (see dot-dash position of FIG. 1). The absolute height of the said pressure may be determined by a pressure reducing valve 13 preceding control valve 12.

For withdrawing the raw tire from the bead-pressing device in which the raw tire is held in centered position, the transporting device is moved relative to the bead-pressing device and is so arranged that the centers of both receiving devices are in alignment with each other. The gripper members then pivot inwardly and rest against the raw tire in which position they are arrested. Only thereafter, the holding device of the bead-pressing device is released, and the raw tire is conveyed to the tire-heating press. Also here the transporting device may prior to the setting down or prior to the depositing of the raw tire slightly be adjusted so that the raw tire during its insertion into the tire-heating press will be precisely centered. After the raw tire in this position is grasped by the portions of the tire-heating press, the gripper members pivot outwardly, and the transporting device leaves the tire-heating press.

It is, of course, to be understood that the present invention is, by no means, limited to the particular showing in the drawing, but also comprises any modifications within the scope of the appended claims.

What we claim is:

1. transporting device for a raw pneumatic tire, especially a belted raw tire, for transporting a raw tire in a substantially horizontal position from a bead-pressing apparatus to a tire-heating press, which includes: forked frame means, two pairs of pivotable arms supported by said frame means and respectively pivotally connected to diametrically oppositely located portions of said frame means horizontally of said tire, each arm of each of said pairs of arms having its free end provided with gripper means including angle-shaped holding means with one leg of said angle-shaped holding means for engagement with a shoulder area of the tire to be transported and with the other leg of said angle-shaped holding means for engagement with a circumferential area of said tire, and control means associated exclusively with said pairs of arms for selectively freely pivoting the arms of each pair toward and away from each other for adjustment thereof and arresting said arms in their respective desired pivoted position.

2. A transporting device according to claim 1, in which said control means includes a pivoting mechanism operable to exert in four locations substantially the same nominal clamping pressure simultaneously upon all of said gripper means precluding tire deformation.

3. A transporting device according to claim 2, in which said control means includes a single double-acting pivoting mechanism for pivoting the arms relative to said frame means only of the respective pair of pivotable arms while said gripper means on the free ends of said arms are pivotable individually.

* * * * *